United States Patent Office 3,838,116
Patented Sept. 24, 1974

3,838,116
PROCESS FOR PREPARING 1,4-BENZODIAZEPINES
James Valentine Earley, Cedar Grove, Rodney Ian Fryer, North Caldwell, and Armin Walser, West Caldwell, N.J., assignors to Hoffmann-La Roche Inc., Nutley, N.J.
No Drawing. Filed Oct. 8, 1971, Ser. No. 187,840
Int. Cl. C07d 53/04
U.S. Cl. 260—239 BD    4 Claims

ABSTRACT OF THE DISCLOSURE

A process for preparing 1-substituted-1,4-benzodiazepines via the reduction of the corresponding 2-lower alkylthio benzodiazepines is disclosed. The products obtainable by this process are known compounds and are useful as sedatives, anticonvulsants and muscle relaxants.

DESCRIPTION OF THE INVENTION

The present invention relates to a process for preparing known and pharmacologically valuable 1,4 - benzodiazepine derivatives. More particularly, the present invention is concerned with the preparation of 1-substituted-1,4-benzodiazepines. The products obtainable following the instant process are useful as sedative, muscle relaxant and anti-convulsant agents.

Following the process of the present invention, one can prepare benzodiazepine derivatives of the formula

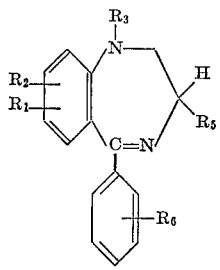

I wherein $R_1$ and $R_2$ are each selected from the group consisting of hydrogen, halogen, trifluoromethyl, lower alkyl, cyano, amino, lower alkanoylamino, di-lower alkylamino, and lower alkoxy; $R_3$ is selected from the group consisting of lower alkyl, lower alkenyl, and di-lower alkylamino-lower alkyl; $R_5$ is selected from the group consisting of hydrogen and lower alkyl; and $R_6$ is selected from the group consisting of hydrogen, halogen, trifluoromethyl, lower alkyl, and lower alkoxy.

The products of formula I above, obtainable by the process of the present invention, are known compounds and are useful as sedatives, anticonvulsants and muscle relaxants.

As used herein, the term "lower alkyl" either alone or in combination refers to straight and branched chain hydrocarbon groups containing from 1 to 7, preferably from 1-4, carbon atoms, such as, for example, methyl, ethyl, propyl, isopropyl, isobutyl, butyl and the like. The term "lower alkenyl" includes straight and branched chain hydrocarbon groups containing from 2–7 carbon atoms, wherein at least one carbon to carbon bond is unsaturated, such as allyl, butenyl, and the like. The term "halogen" refers to all four forms thereof, i.e., bromine, chlorine, fluorine and iodine. The term "lower alkanoyl" includes the acyl residue of lower alkanoic acids, preferably containing from 2 to 4 carbon atoms, for example, acetyl, propionyl, and the like. The term "lower alkoxy" designates straight or branched chain saturated hydrocarbonoxy groups containing from 1 to 7 carbon atoms, preferably from 1 to 4 carbon atoms, such as methoxy, ethoxy, propoxy and the like.

In following the novel process of the present invention, the known and useful compounds of formula I above are prepared by the reduction of the corresponding 2-lower alkylthio benzodiazepines of the formula

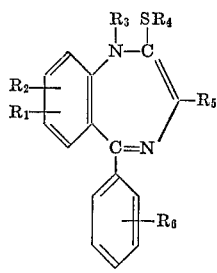

wherein $R_1$–$R_3$, $R_5$ and $R_6$ are as described above and $R_4$ is lower alkyl with Raney nickel.

In a preferred aspect of the present invention, $R_1$ in the starting material of formula II is halogen, preferably chlorine, and is located at the 7-position of the benzodiazepine moiety; and $R_6$ is hydrogen or halogen, preferably chlorine or fluorine, and is located in the ortho position of the 5-phenyl ring; so that by following the novel process of the present invention there is obtained a compound of the formula

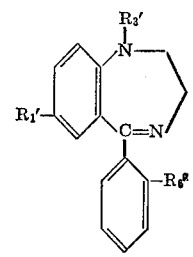

Ia wherein $R_1'$ is halogen, preferably chlorine, $R_3'$ is lower alkyl, preferably methyl, and $R_6'$ is hydrogen or halogen, preferably chlorine or fluorine.

In a most preferred aspect of the present invention, $R_1$ in the starting material of formula II is chlorine and is located at the 7-position of the benzodiazepine moiety, $R_2$ is hydrogen, $R_3$ is methyl, $R_5$ and $R_6$ are hydrogen, so that by following the inventive process there is obtained a compound of the formula

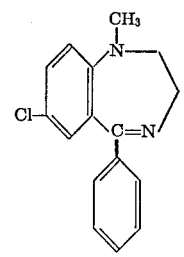

Ib

The reduction of the 2-lower alkylthio compounds of formula II to yield the corresponding compounds of formula I above is accomplished by treating the starting materials of formula I with Raney nickel. The alkylthio compounds of formula II, on reaction with Raney nickel undergo hydrogenolysis. The reaction may be conducted using an excess of Raney nickel in which case no added hydrogen is required since a sufficient quantity is adsorbed on or dissolved in the catalyst. Alternately, the reaction can be effected using Raney nickel under hydrogenation conditions.

The Raney nickel reduction of a compound of formula II above is expediently effected in the presence of an inert organic solvent. Representative examples of inert solvents that can be used for this purpose include acetone, ethanol, dioxane, tetrahydrofuran and the like.

The reduction reaction can be effected at room temperature or below or with the application of heat and at atmospheric pressure or under pressure. It is preferably effected at room temperature and atmospheric pressure.

The compounds of formula II above used as the starting materials in the process of the instant invention are prepared by alkylating a compound of the formula

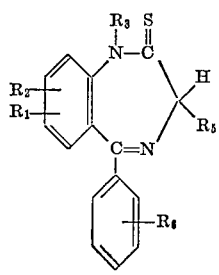

III wherein $R_1$–$R_3$ and $R_5$–$R_6$ are as described above.

The alkylation of the thione of formula III is expediently carried out by first converting said compound to its alkali metal salt, preferably the sodium salt. Conversion of the compound of formula III to its alkali metal salt is effected, for example, by reacting said compound with an alkali metal base. Suitable bases for this purpose include alkali metal alkoxides, such as sodium methoxide, potassium t-butoxide and the like, and alkali metal hydrides, such as sodium hydride and the like. Preparation of the alkali metal salt of the compound of formula III is preferably effected in the presence of an inert organic solvent such as an aromatic hydrocarbon, i.e., benzene, toluene and the like, dimethylformamide (DMF), dimethylsulfoxide (DMSO) and tetrahydrofuran. Use of an inert organic solvent like DMF is preferred since solvents of this type can also be utilized in the alkylation step, thus eliminating the necessity of first isolating the alkali metal salt.

The alkali metal salt of a compound of formula III is then treated with an appropriate alkylating agent. Representative of the alkylating agents useful for these purposes include alkyl halides, such as methyl iodide, ethyl iodide and the like, and alkyl sulfates, such as methyl sulfate; with alkyl halides being the preferred alkylating agents.

As indicated above, the alkylation reaction is preferably effected in the presence of an inert organic solvent. Temperature and pressure are not critical to the process so that for the sake of convenience the reaction is preferably effected at room temperature and atmospheric pressure.

The compounds of formula III above used as the starting materials for this process aspect are known or can be prepared in analogy to the preparation of the known compounds.

In an alternate process aspect of the present invention, the desired compounds of formula I above can be prepared by the desulfurization of the alkylthio compounds of formula II to yield the corresponding 1H compound, and the subsequent reduction of the so-obtained 1H compound to the 2,3-dihydro derivative. The desulfurization of the formula II compound is accomplished with Raney nickel in the presence of an organic base such as diethylamine, triethylamine and the like. The reaction can be effected at room temperature or above or below room temperature and is preferably carried out in the presence of an inert organic solvent such as acetone. This reaction results in the preparation of the 1H compound of the formula

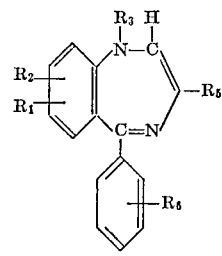

IV wherein $R_1$–$R_3$, $R_5$ and $R_6$ are as described above.

The compound of formula IV above can then be reduced with Raney nickel to the desired 2,3-dihydro compound of formula I. This reduction can be effected using an excess of Raney nickel or by employing the Raney nickel under hydrogenation conditions. It is preferable to perform this reaction in the presence of an inert organic solvent such as acetone, ethanol, dioxane, tetrahydrofuran and the like.

The following examples are illustrative of the scope of the present invention. The temperatures are given in degrees centigrade.

EXAMPLE 1

Preparation of 7-chloro-1-methyl-5-phenyl-2-methylthio-1H-1,4-benzodiazepine

A solution of 3.0 g. (0.01 M) of 7-chloro-1-methyl-5-phenyl-3H-1,4-benzodiazepin-2-thione [1] in 20 ml. of dry N',N'-dimethylformamide under nitrogen was treated with 0.46 g. (0.011 M) of a 57% dispersion of sodium hydride in mineral oil. The reaction mixture was stirred for 30 min., cooled in an ice bath, and treated with 2.0 g. (0.014 M) of methyl iodide. After 1.5 hr., at room temperature, the solution was poured onto ice, and the precipitate was removed by filtration. This was dissolved in 30 ml. of dichloromethane, which was washed with 30 ml. of water, 20 ml. of saturated brine, dried over anhydrous sodium sulfate, and evaporated to dryness. The residual oil crystallized on standing and was recrystallized from ethanol and then from a mixture of ether and petroleum ether to give the above-named product as orange prisms, m.p. 77–81°.

EXAMPLE 2

Preparation of 7-chloro-2-ethylthio-5-(2-fluorophenyl)-1-methyl-1H-1,4-benzodiazepine A solution of 16 g. (0.05 M) of 7-chloro-1,3-dihydro-5 - (2 - fluorophenyl)-1-methyl-2H-1,4-benzodiazepine-2-thione [2] in 40 ml. of N,N-dimethylformamide was treated with 14.1 ml. (0.06 M) of a 4.23 N solution of sodium methoxide in methanol, and after 1 hour the mixture was cooled in an ice bath when 11.7 g. (.075 M) of ethyl iodide was added with stirring. The reaction mixture was then stirred at room temperature for 3 hours, when it was poured into 500 ml. of cold water. The precipitate was removed by filtration, and was dissolved in 75 ml. of dichloromethane which was dried over anhydrous sodium sulfate and concentrated to 30 ml. Methanol was added and the remainder of the dichloromethane was removed on the steam bath. The solution was cooled and filtered. Recrystallization of the product from a mixture of dichloromethane and methanol to give the above-named product as red prisms, m.p. 103–104°.

---

[1] The starting material was prepared according to the procedures set forth in G. A. Archer and L. H. Sternbach, J. Org. Chem., 29, 231 (1964).

[2] The starting material was prepared according to the procedures set forth in G. A. Archer and L. H. Sternbach, J. Org. Chem., 29, 231 (1964).

EXAMPLE 3

Preparation of 7-chloro-2,3-dihydro-1-methyl-5-phenyl-1H-1,4-benzodiazepine hydrochloride A mixture of 1.0 g. (0.00317 M) of 7-chloro-1-methyl-5-phenyl-2-methylthio-1H-1,4-benzodiazepine and ½ teaspoon of Raney nickel in 25 ml. of acetone was allowed to stand for 66 hours. The solution was filtered over Celite, which was washed thoroughly with dichloromethane. The combined filtrates were dried over anhydrous sodium sulfate, filtered and evaporated to dryness. The residue was dissolved in benzene and filtered through 50 g. of basic alumina, using first benzene and then dichloromethane as the eluents (discarded). Elution with methanol gave after removal of solvent, 0.5 g. of an oil which was dissolved in dichloromethane, and washed with dilute ammonium hydroxide. The dichloromethane solution was concentrated and then applied to a silica gel thick layer plate. After developing the plate in ethyl acetate, the area corresponding to 7-chloro-2,3-dihydro-1-methyl-5-phenyl-1H-1,4-benzodiazepine was scraped off, washed with methanol and filtered. The filtrate was treated with ethanolic hydrogen chloride and the solution was evaporated to dryness. The residual salt was crystallized from ether and recrystallized from a mixture of isopropanol and ether to give yellow prisms of the above-named product which decomposed at 254–259°.

EXAMPLE 4

Preparation of 7-chloro-5-(2-fluorophenyl)-2,3-dihydro-1-methyl-1H-1,4-benzodiazepine hydrochloride A solution of 2.5 g. (0.0072 M) of 7-chloro-2-ethylthio-5-(2-fluorophenyl)-1-methyl-1H-1,4-benzodiazepine in 35 ml. of acetone was treated with one teaspoon of Raney nickel, and the mixture was stirred for 20 hours. The solution was filtered through Celite, which was then washed thoroughly with dichloromethane. The filtrates were combined, and evaporated to dryness. The residue was dissolved in 20 ml. of dichloromethane, dried over anhydrous sodium sulfate, filtered and evaporated to dryness. Next the residue was dissolved in 20 ml. of benzene and chromatographed over a basic alumina column. Elution with 1 l. of benzene and 1 l. of dichloromethane gave, after evaporation of the solvents, starting material. Using 2 l. of ethyl acetate as the eluent, gave after evaporation, 0.6 g. of an oil. This was crystallized as the hydrochloride by adding ethanolic hydrogen chloride, followed by ether. Recrystallization from a mixture of methanol and ether gave 7-chloro-5-(2-fluorophenyl)-2,3-dihydro-1-methyl-1H-1,4-benzodiazepine hydrochloride as orange rods, m.p. 243–245° dec. (sealed tube).

EXAMPLE 5

Raney nickel was added to a solution of 1 g. of 7-chloro-1-methyl-5-phenyl-1H-1,4-benzodiazepine in 25 ml. of ethanol. After stirring for 2 hours at room temperature in an atmosphere of nitrogen, the initial red color has faded. The catalyst was removed by filtration and the filtrate was evaporated. The residue was passed through a column of 25 g. of silica gel with the solvent mixture methylene chloride:ethyl acetate 1:1 (v./v.). Crystallization of the combined clear fractions from ether/hexane yielded pure 7-chloro-2,3-dihydro-1-methyl-5-phenyl-1H-1,4-benzodiazepine with m.p. 97–99°.

The starting material can be prepared as follows:

A mixture of 1 g. of 7-chloro-1-methyl-5-phenyl-2-methylthio-1H-1,4-benzodiazepine, 10 g. of Raney nickel, 20 ml. of diethylamine and 20 ml. of benzene was stirred at room temperature for 6 hours under nitrogen. The residue obtained after filtration and evaporation was chromatographed in 30 g. of silica gel treated with diethylamine in hexane. Crystallization of chromatographically pure material from hexane yield 7-chloro-1-methyl - 5 - phenyl - 1H - 1,4-benzodiazepine as a red product, m.p. 76–79°.

What is claimed is:

1. A process for the preparation of a compound of the formula

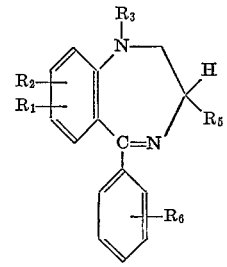

wherein $R_1$ and $R_2$ are each selected from the group consisting of hydrogen, halogen, trifluoromethyl, lower alkyl, cyano, amino, lower alkanoylamino, di-lower alkylamino, and lower alkoxy; $R_3$ is selected from the group consisting of lower alkyl, lower alkenyl, and di-lower alkylamino-lower alkyl; $R_5$ is selected from the group consisting of hydrogen and lower alkyl; and $R_6$ is selected from the group consisting of hydrogen, halogen, trifluoromethyl, lower alkyl, and lower alkoxy, which comprises reducing a compound of the formula

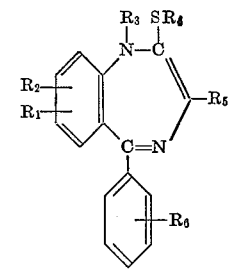

wherein $R_1$–$R_3$, $R_5$ and $R_6$ are as described above and $R_4$ is lower alkyl with Raney nickel at room temperature in the presence of an inert organic solvent.

2. The process of claim 1 wherein the inert organic solvent is acetone.

3. The process of claim 1 wherein $R_1$ is halogen and is located at the 7-position of the benzodiazepine moiety, $R_2$ and $R_5$ are hydrogen, $R_3$ is lower alkyl and $R_6$ is hydrogen or halogen and is located at the ortho position of the 5-phenyl ring.

4. The process of claim 3 wherein $R_1$ is chlorine, $R_3$ is methyl and $R_6$ is hydrogen.

References Cited

UNITED STATES PATENTS 3,678,036    7/1972    Archer et al. ____ 260—239 BD

JOSEPH A. NARCAVAGE, Primary Examiner